No. 844,502. PATENTED FEB. 19, 1907.
J. O. DICKINSON.
COTTON HARVESTER.
APPLICATION FILED JULY 24, 1906.
2 SHEETS—SHEET 1.
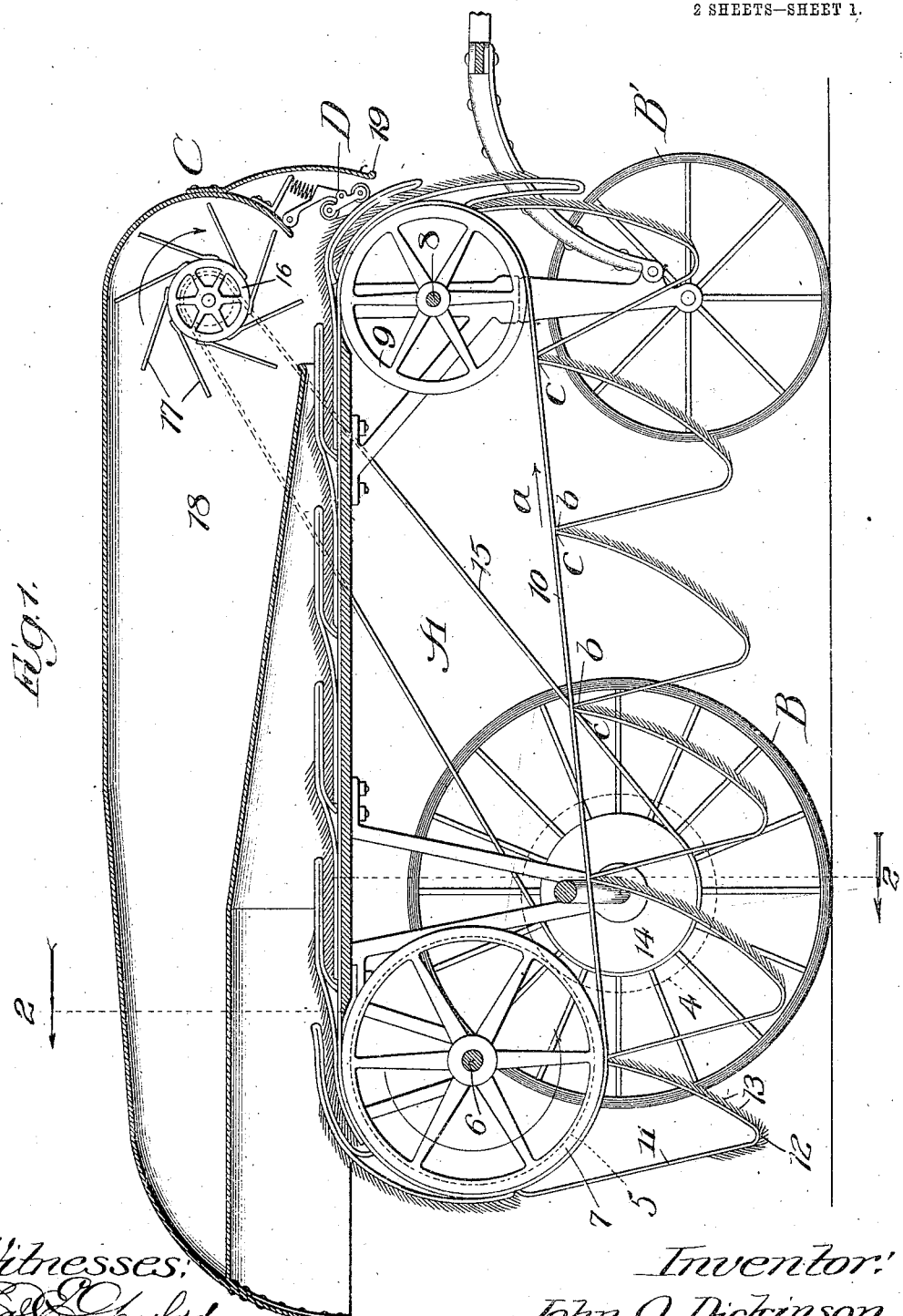
Witnesses:
Inventor:
John O. Dickinson,
By Robert Catherwood
Att'y

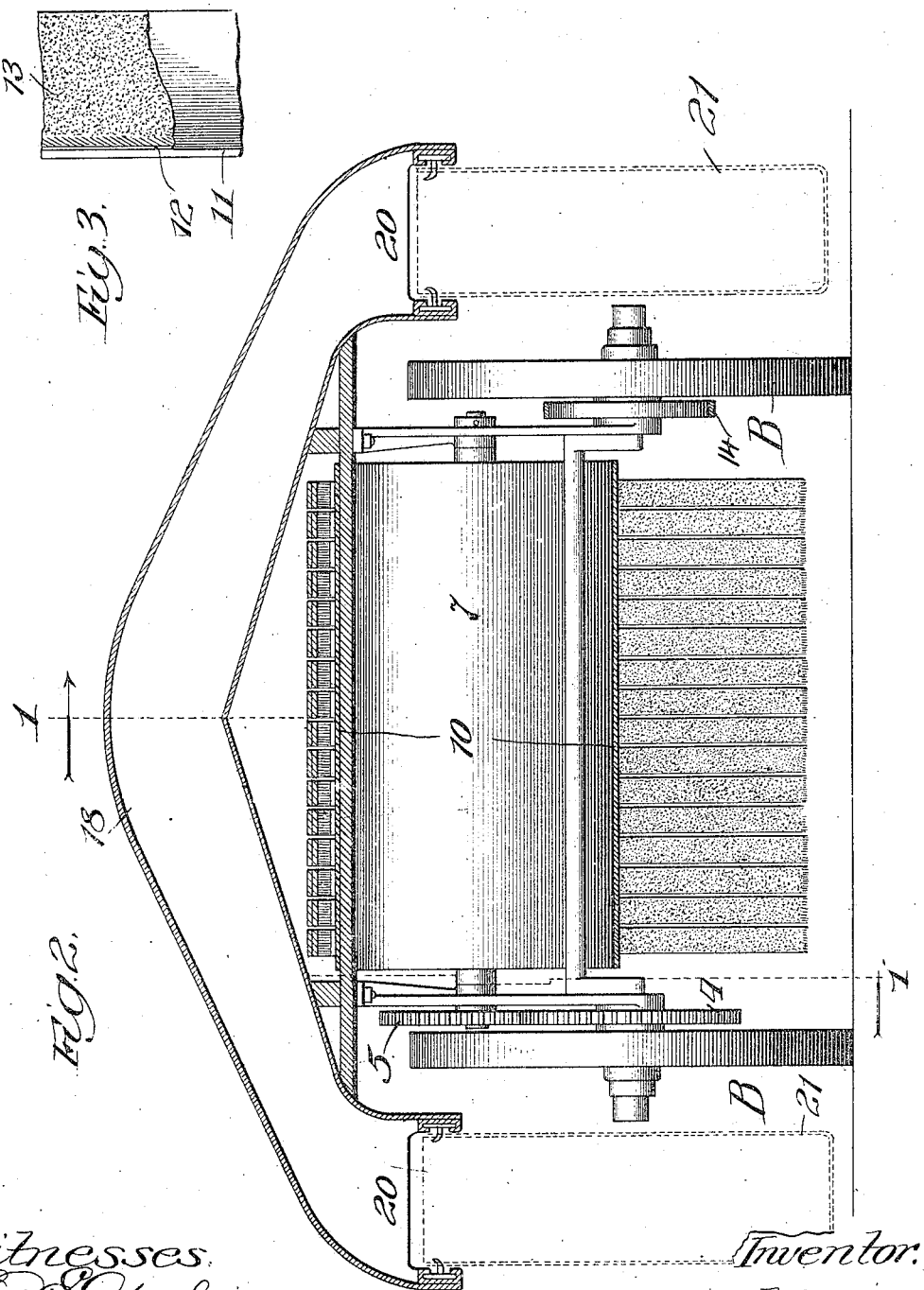

UNITED STATES PATENT OFFICE.

JOHN OVERTON DICKINSON, OF NASHVILLE, TENNESSEE.

COTTON-HARVESTER.

No. 844,502. Specification of Letters Patent. Patented Feb. 19, 1907.

Application filed July 24, 1906. Serial No. 327,503.

*To all whom it may concern:*

Be it known that JOHN OVERTON DICKINSON, a citizen of the United States, residing at Nashville, in the county of Davidson and State of Tennessee, has invented certain new and useful Improvement in Cotton-Harvesters, of which the following is a specification, reference being had therein to the accompanying drawings.

My invention relates to cotton-harvesters, and has for its object the construction of a durable and economical machine of this character, simple and expeditious in its operation, which will pick or strip the bolls clean of the cotton fiber without damaging the plant, and thereafter deposit the cotton in sacks or other convenient receptacles.

In general the invention comprises a carriage or wheel frame carrying a blast-fan and an inclined belt from which a plurality of toothed flexible loops or narrow strips depend in such a manner that on contact they will arch over the plant and comb it from bottom to top, the teeth or spikes impaling the fiber in the bolls and delivering it to a suction-blast, by which it is drawn from the teeth and delivered into suitable receptacles.

In the accompanying drawings I have illustrated a machine embodying my invention, wherein—

Figure 1 is a longitudinal sectional view taken near the middle of the machine on line 1 of Fig. 2; Fig. 2, a transverse sectional view on line 2 of Fig. 1; and Fig. 3, a broken detail perspective view of one of the loop-sections, illustrating my preferred construction thereof.

A indicates a suitable carriage-frame mounted on traction-wheels B and B'. Upon the axle of one of the rear traction-wheels is mounted a gear 4, intermeshing with a gear 5 on a shaft 6, journaled in the frame A, preferably about three feet from the ground and at the extreme rear of the carriage. Shaft 6 extends transversely across the carriage and has mounted upon it a drum or cylinder 7. At the forward end of the machine is a somewhat similar shaft 8, mounted in the frame A, extending across the machine, upon which is mounted a similar drum or cylinder 9. Over drums 7 and 9 runs an endless belt or apron 10. By the above-described gears the apron is advanced in the direction of the arrow *a* as the carriage is drawn along the cotton-rows. To the belt or apron 10 is attached or made integral with it a series of flexible toothed loops 11. They are preferably made with a foundation of canvas strips about two inches in width, attached to the apron at the points *b c*, each row of the series extending across the belt, as shown in Fig. 2. Upon the forward face of each loop is a leather facing 12, adapted to carry a large number of teeth or spikes 13, set closely together and pointed upwardly and forwardly. The loops thus have a certain flexible rigidity, so that when drawn over the plant they arch and bend over it, combing it from bottom to top and impaling the fiber on the numerous spikes of the various loops. The drums 7 and 9 are arranged so that the loops which drop over the rear end of the machine are nearest the ground, and the inclination of the belts gradually draws them up as they are advanced to the forward end of the machine, where they come within the range of a powerful suction-blast which draws the cotton fiber from the spikes as the loops fold over drum 9. A blast-fan or suction device C is driven from pulley 14 on the axle of wheel B by belt 15, which passes over a pulley 16, adapted to rotate the fan C. Fan C is provided with blades or wings 17, funnel 18, a mouth extension 19, brought well down to the front of the machine, and discharge openings or outlets 20 at the rear of the machine, to which I prefer to attach suitable receptacles 21, which may be readily removed when filled with the cotton fiber.

In order to arrange the loops as they pass under the funnel 18 and over the drums, it may be found convenient to provide spring-supported rollers D, adapted to press the loops against the drum 9.

The operation of my device is as follows: As the machine is driven along the field over the rows of cotton the outer or front faces of succeeding sets of the depending loops 11 on the inclined apron 10 are in turn dragged against the tops, centers, and bottoms of the plants, the strength of the loops being sufficient to bend without damaging the plant. The belt thus draws the teeth through the plant and engages the ripened cotton fiber of the bottom, center, and top, carrying it upward and forward to the suction-blast, where the cotton flies from the teeth into the funnel 18 and is discharged through openings 20 into the receptacles 21. When the machine has been drawn down one cotton-row, it is turned and hauled back again in the opposite direction, so as to strip or clean both sides of the plant.

What I claim is—

1. In a cotton-harvester, a frame provided with an endless belt the rear of which is nearer the ground than the forward end thereof, rows of stiff loops each attached at their ends to said belt, that portion of the surface of each loop which forms the forward outer face thereof when the loop is in dropped or depending position having upwardly-projecting teeth or spikes, and suction-blast mechanism adapted to draw cotton fiber from said teeth and spikes and deliver it to suitable receptacles, for the purposes described.

2. In a cotton-harvester, the combination with an endless belt adapted to travel in a plane at an angle to the plane of the surface of the ground upon which the harvester advances, means for propelling it and means for transporting it, of rows of loops attached to said belt, teeth or spikes on that portion of the surface of each loop which forms the forward outer face when the loop is in dropped or depending position, said loops being adapted to penetrate cotton-plants beneath said belt and draw said teeth therethrough from bottom to top to collect the fiber thereon, and blast mechanism adapted to remove the fiber from the teeth, substantially as described.

3. In a cotton-harvester, a carriage, drums driven by said carriage, an endless belt traveling on said drums, blast mechanism driven by said carriage, and rows of loops secured to said belt having teeth or spikes on that portion of the surface of each loop which forms the forward exterior face when the loop is in dropped or depending position.

4. In a cotton-harvester, a wheeled frame provided with an endless traveling apron, rows of stiff loops each attached at its ends to said apron and having capacity for flexion in curves over the cotton-plants, means for collecting the fiber on a portion of the surface of said loops, and suction mechanism adapted to collect said fiber from said loops and deliver it to suitable receptacles, for the purposes described.

In testimony whereof he hereunto affixes his signature in presence of two witnesses.

JOHN OVERTON DICKINSON.

Witnesses:
E. N. KEARNY,
R. I'ON LOWNDES.